Sept. 29, 1970  W. H. DUMBAUGH, JR  3,531,305
METHOD OF MAKING INFRARED TRANSMITTING GERMANATE GLASSES
Filed March 6, 1967  2 Sheets-Sheet 1

INVENTOR.
WILLIAM H. DUMBAUGH, Jr.
BY
Gerhard K. Adam
ATTORNEY

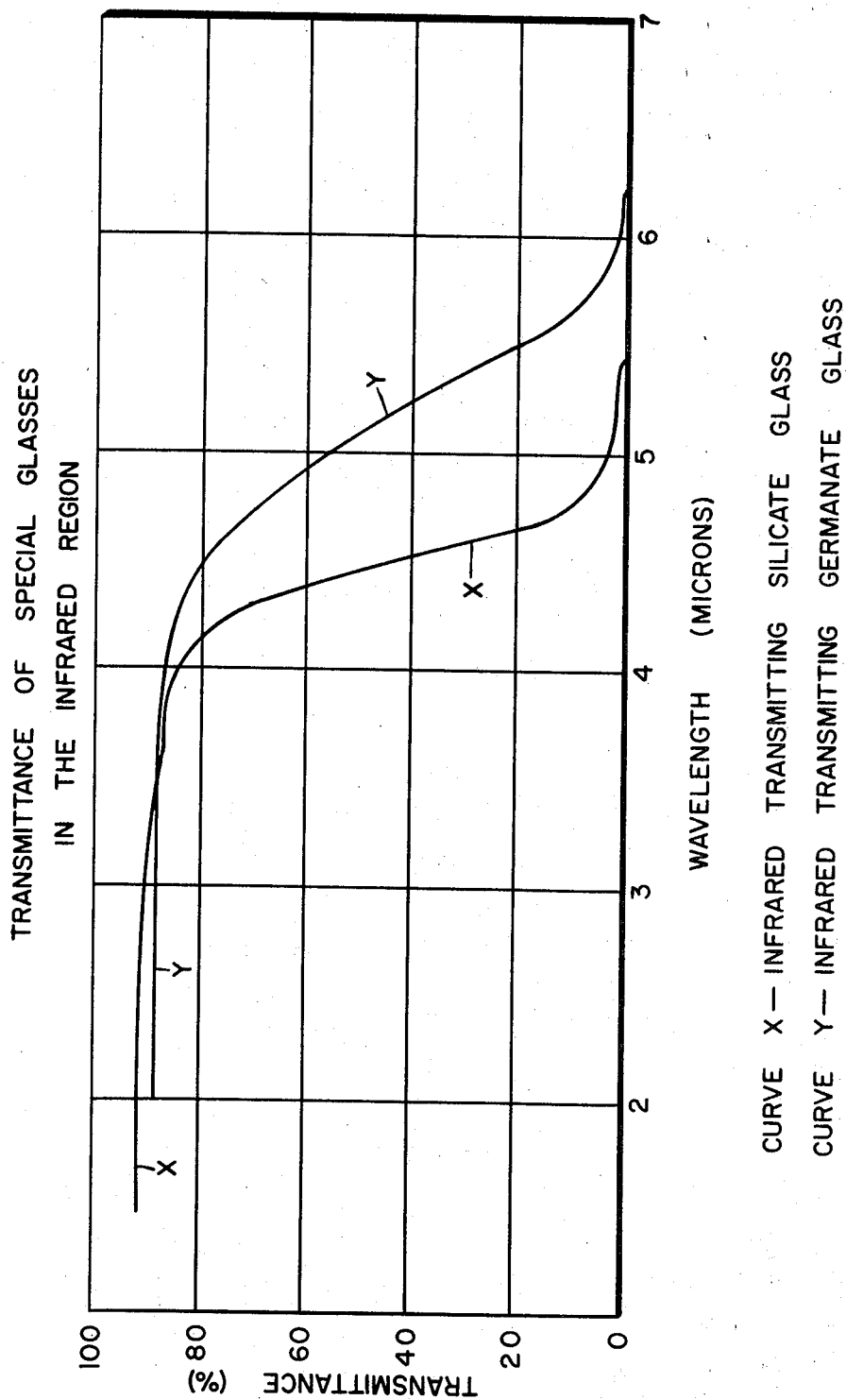

# United States Patent Office 3,531,305
Patented Sept. 29, 1970

3,531,305
METHOD OF MAKING INFRARED TRANS-MITTING GERMANATE GLASSES
William H. Dumbaugh, Jr., Corning, N.Y., assignor to Corning Glass Works, Corning, N.Y., a corporation of New York
Filed Mar. 6, 1967, Ser. No. 620,793
Int. Cl. C03c 3/00
U.S. Cl. 106—47                        4 Claims

ABSTRACT OF THE DISCLOSURE

Glasses having improved infrared transmitting properties based on a calcium oxide-aluminum oxide-germanium oxide system and a method of making such glasses having a very low water content to improve the transmission in the region of about 2.9 microns.

---

Figure 1:
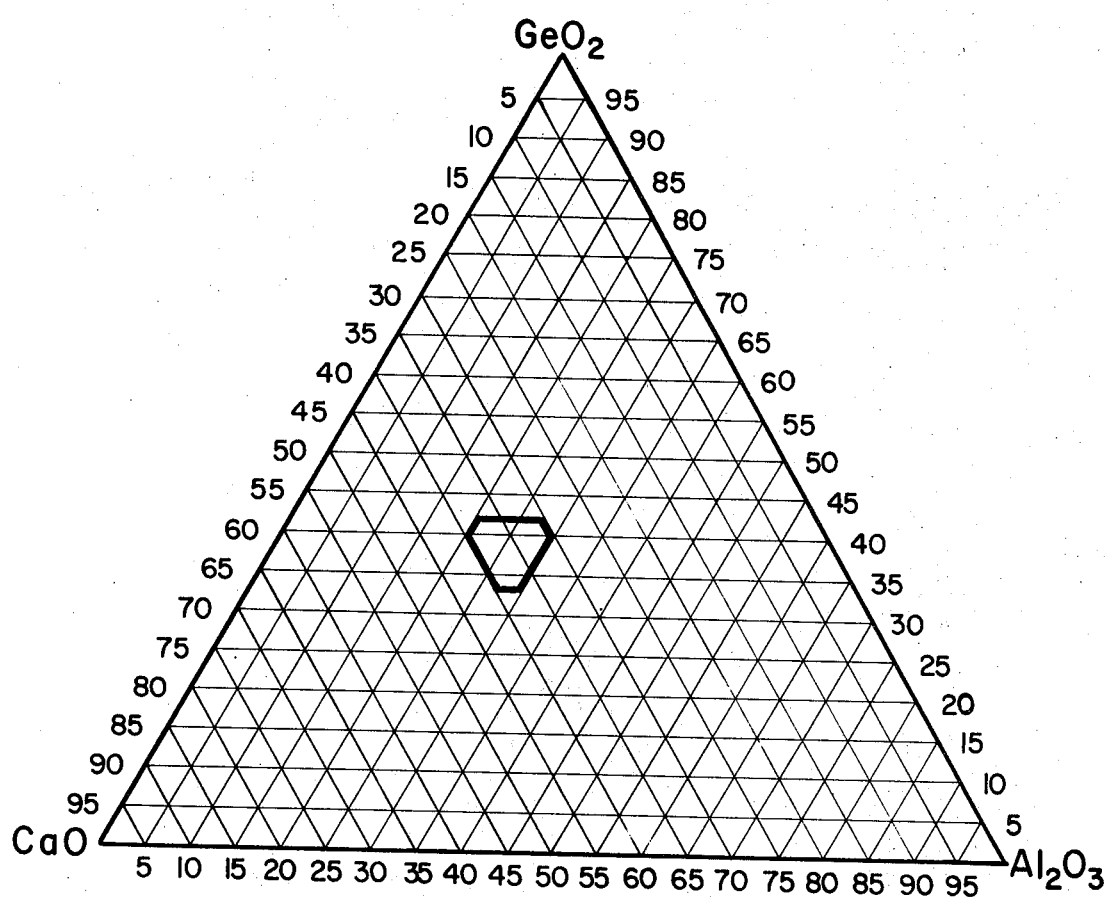

Glasses which have good infrared transmitting properties are being widely used in various industries, for example, for infrared illumination and signaling. These glasses also have specific military uses. However, for the latter purpose the glass is required to have certain other physical properties. It is necessary that the glass be substantially resistant to thermal shock by exposure to rapid heating and cooling without breakage. Thus one requirement is that the glass have an expansion coefficient below about $80 \times 10^{-7}$ per degree C. over a temperature range between 0° and 300° C.

It has been reported by E. B. Shand in "Glass Engineering Handbook," McGraw-Hill (1958), 62, that absorption in the infrared region for silicate glasses becomes practically complete at wave lengths between 4 and 5 microns. As an illustration, the author shows the transmittance curve of a 96% silica glass having a transmittance of approximately 40% at a wave length of 3.5 microns and 30% at a wave length of 4 microns. While this glass may be useful for some purposes, it does not meet the requirements for certain military uses wherein the glass should have an infrared transmittance of at least 80% at a wave length of 3.5 microns and at least 70% transmittance at a wave length of 4.0 microns for a 2 millimeter thickness of glass.

In my copending application, Ser. No. 439,207, filed on Mar. 12, 1965, I have described particular silicate glasses based upon the calcium oxide-aluminum oxide-silica system, which have the above infrared transmission requirement. Such glasses, in addition, have a coefficient of expansion sufficiently low to prevent breakage as a result of thermal shock. These glasses unfortunately have an undesirable infrared absorption band, in the region of 2.75–2.95 micron wave length, due to the presence of water in the glasses.

Particularly, residual water causes a strong absorption of infrared at a wave length of about 2.9 microns, resulting in a sharp break in the transmittance curve. Absorption, or conversely transmittance at a wave length of 2.6 microns is relatively insensitive to the low concentrations involved in residual water. Residual water content may therefore be specified in terms of an absorption coefficient, hereafter called "beta value" and designated "$B_{OH}$," which is calculated from the formula:

$$B_{OH} = \frac{1}{t} \log_{10} \frac{T_{2.6}}{T_{2.9}}$$

wherein
 $t$ = glass thickness in mm.
 $T_{2.6}$ = transmittance in percent at 2.6 microns
 $T_{2.9}$ = transmittance in percent at 2.9 microns
and $B_{OH}$ is in terms of mm.$^{-1}$.

In another copending application, Ser. No. 605,677, filed Dec. 29, 1966, I have described a method of improving the infrared transmission of the silicate glasses by substantially removing the water absorption band. Unfortunately, even the improved silicate glasses almost completely absorb infrared rays at a region of 5.0 microns in ordinary thicknesses and tend to be inadequate for more sophisticated military uses.

It is therefore an object of the present invention to provide an improved infrared transmitting glass having a substantial transmittance at a wave length of between 5.0 and 6.0 microns.

It is a further object of the present invention to provide a method of substantially removing the water absorption band of the improved infrared transmitting glass.

In accordance with the present invention, I have discovered an improved infrared transmitting glass consisting essentially on the oxide basis as calculated from the batch of 33–42.5 mole percent germanium oxide ($GeO_2$), 20–30 mole percent aluminum oxide ($Al_2O_3$) and 30–40 mole percent calcium oxide (CaO). These glasses when formed into a body having a thickness of about 2 millimeters have a transmittance of at least 80% at a wave length of 4.25 microns, 50% at a wave length of 5.0 microns, and 15% at a wave length of 5.5 microns. Further I have discovered an improved method of making an infrared transmitting glass body of calcium oxide-aluminum oxide-germanium oxide glass by mixing the batch ingredients together with an effective amount of a chemically reactive chlorine containing agent and melting the glass at the fusion temperatures in the presence of a dry atmosphere flowing directly over the glass melt. The novel infrared transmitting glass body prepared by this method in addition to the transmission characteristics described above also has a maximum $B_{OH}$ value of 0.020 mm.$^{-1}$.

The ranges of ingredients are considered to be critical. The amount of germania present in the glass composition should be from 33–42.5 mole percent. When less than 33 mole percent is present, there is a great tendency for the glass to divitrify, whereas an amount greater than 42.5 mole percent (but below 50%) also results in devitrification. It is generally desirable to keep the amount of germania low and compositions in which the germania content is greater than 50 mole percent, although they may fall within glass forming regions, increase the cost prohibitively. The aluminum oxide portion should range between 20–30 mole percent. Less than 20% aluminum oxide causes the glass to devitrify, but more than 30% causes the melting temperature to become excessively high for commercial melting tanks. Finally, the calcium oxide content should range between 30–40 mole percent. When less than 30 mole percent is present, the liquidus is raised too high for melting and there is a tendency toward devitrification, whereas the presence of more than 40 percent makes it too difficult to form a glass. In addition it was found that the thermal expansion of the glass increases with increasing amounts of calcium oxide towards the maximum desired value.

In order to form the novel glass of this invention proper selection of batch materials is required. Thus hydrated materials such as alumina hydrate and calcium hydroxide must be avoided since these have a large effect on the water content of the glass. The type of germania and calcined alumina can also affect water content, but to a much lesser extend than the hydrated materials.

Various modifications of the base ternary calcium oxide-aluminum oxide-germanium oxide system may be made by the addition of minor amounts of up to about seven mole percent of certain other oxides. Thus substitution for calcium oxide by an equal amount of other alkaline earth metal oxides, such as, magnesium oxide, strontium oxide and barium oxide may be made. Also zinc oxide and cadmium oxide may be added in amounts of up to seven mole percent. Other oxides which may similarly be added include lanthanum oxide and titanium oxide.

This invention will be more clearly understood from the following description taken in conjunction with the following drawing in which:

FIG. 1 is a phase diagram of the ternary glass system useful in forming the improved infrared transmitting calcium oxide-aluminum oxide-germanium oxide glass of the invention.

FIG. 2 graphically shows a comparison of the transmittance characteristics of glasses 2.0 mm. thick in the infrared region. Curve X represents the percent transmittance of an infrared transmitting silicate glass after removal of the OH group absorption band. This glass is described in my copending application, Ser. No. 605,677, filed Dec. 29, 1966, mentioned hereinabove. The percent transmittance of a preferred infrared transmitting germanate glass prepared according to the present invention is represented by Curve Y. It is readily apparent that the transmittance in the infrared region is substantially greater for the germanate glass than it is for the silicate glass which is shown by the area between Curve X and Curve Y.

It is important, in making infrared transmitting glasses having a maximum $B_{OH}$ value of 0.020 mm.$^{-1}$, by my novel process, that the batch ingredients initially be mixed together with a chemically reactive, chlorine containing agent. As used herein this agent is a compound which is capable of reacting during melting to replace the OH groups present in the glass network. The reaction may be illustrated as follows:

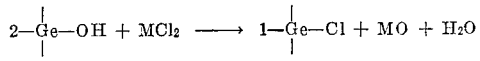

The preferred agent is anhydrous calcium chloride which is typically mixed in powder form with the glass batch. An amount of chlorine at least equivalent to 4 mole percent $CaCl_2$ is necessary to substantially remove the OH group as described hereinabove; however no more than an amount of chlorine equivalent to seven mole percent of $CaCl_2$ is useful. Since it is very hygroscopic, it is important that the calcium chloride or the batch containing it not be exposed to moisture for any length of time. Other agents which can be used include the chlorides of the other alkaline earth metals, zinc, cadmium, lanthanum, and aluminum. Thus, for example any of the other alkaline earth chlorides can be substituted for an equal amount of calcium oxide in the base composition without detrimentally affecting the required properties of the product.

During the melting of the bach at the fusion temperature of about 1500°–1650° C., it is necessary that a dry atmosphere flow drectly over the glass melt. This is essential to remove any of the water formed by the reaction with the chlorine containing agent from the reaction zone and to prevent any other moisture from reaching the surface. By flowing the dry gas directly over the glass melt, a low water vapor pressure is maintained and the water is removed rapidly to displace the reaction equilibrium in favor of substantial complete substitution of chorine for the OH group. Dry atmospheres useful herein include dry or dried gases, such as air, nitrogen, helium, argon, oxygen, carbon dioxide and sulfur dioxide. While the rate of flow of the dry atmosphere depends on many factors, such as the size and surface area of the vessel or furnace in which the glass is being fused, there should be a sufficient flow to adequately remove the water vapor which has formed.

The fused glass is then subjected to conventional glass forming techniques. It can be cast into a desired shape, conventionally annealed, and subjected to grinding and polishing. The preferred glass product then formed is a unique infrared transmitting glass having a transmission at 2.9 microns of greater than 86 percent and a water content of less than $B_{OH}$ value of 0.010 mm.$^{-1}$.

My invention is further illustrated by the following examples.

EXAMPLE I

A preferred infrared transmitting germanate glass was prepared and melted from the following formulation:

| Oxide | Weight percent | Mole percent | Batch Materials | Weight (grams) |
|---|---|---|---|---|
| GeO₂ | 44.7 | 36.9 | Germanium dioxide | 650.4 |
| Al₂O₃ | 31.7 | 26.8 | Calcined alumina | 460.5 |
| CaO | 23.6 | 36.3 | Calcium carbonate | 529.8 |
|  |  |  | Calcium chloride | 93.5 |

The batch was then placed in a platinum crucible and melted at 1500° C. for 4 hours with dry nitrogen flowing over the surface at about 100 cc./min. It was then cast into a slab or pressed into a dome shape and annealed at 760° C.

The infrared properties of the glass are shown in the FIG. 2 and have been designated as Curve Y. Other properties of the glass product were determined using standard testing methods and are set forth in the table below.

TABLE I

Annealing point—758° C.
Strain point—720° C.
Expansion coefficient (250–300° C.)—63.6×10$^{-7}$/° C.
Density—3.354 g./cm.$^3$
Knoop hardness (KHN$_{100}$)—560
Refractive index 5893A—1.6601
Nu value—46.4

A piece of the glass product 2 mm. in thickness exhibited a $B_{OH}$ value of less than 0.01 mm.$^{-1}$.

An infrared transmitting silicate glass composition was prepared and melted from the following formulation:

| Oxide | Weight percent | Mole percent | Batch Materials | Weight (grams) |
|---|---|---|---|---|
| SiO₂ | 31.8 | 36.91 | Berkeley Fine Dry Sand | 91.84 |
| Al₂O₃ | 39.2 | 26.80 | Alcoa T-61 calcined alumina | 113.26 |
| CaO | 29.2 | 36.28 | Calcium carbonate | 129.95 |
|  |  |  | Calcium chloride | 22.92 |

The batch materials were weighed and mixed by ball milling for four hours.

The substantially homogeneously mixed batch containing the chemically reactive, chlorine containing agent was then transferred into a platinum crucible, placed in a platinum-rhodium wound tube furnace, and heated at a temperature of 1550° C. As the batch was being melted, dry nitrogen gas was continuously flowing directly over the surface of the melt at a rate of 100 cc./min. After four hours, the nitrogen flow tube was removed, the melt was immediately poured into an iron mold and then the glass was annealed by slowly cooling from 832° C.

The infrared properties of the glass are shown in the FIG. 2 and have been designated as Curve X. A piece of the glass product 2 mm. in thickness exhibited a $B_{OH}$ value of less than 0.01 mm.$^{-1}$.

A comparison between the infrared transmitting properties of the germanate glass of Example I, as shown in Curve Y, and the silicate glass of Example II, as shown in Curve X, shows the superiority in transmittance of the germanate glass in the region between 5.0–6.0 microns.

I claim:

1. In a method of making an infrared transmitting glass body having a transmittance of at least 80% at a wavelength of 4.25 microns, 50% at a wavelength of 5.0 microns, and 15% at a wavelength of 5.5 microns for a 2 millimeter thickness of said glass and consisting essentially on the oxide basis as calculated from the batch of 33–42.5 mole percent germanium oxide, 20–30 mole percent aluminum oxide, and 30–40 mole percent of calcium oxide, the improvements comprising (a) mixing the batch ingredients together with an effective amount of a solid chemically reactive chlorine containing agent, said amount being equivalent to 4–7 mole percent of calcium chloride, and (b) melting the batch at the glass fusion temperatures in the presence of a dry atmosphere flowing directly over the glass melt, such that the glass body formed from said melt has a maximum $B_{OH}$ value of 0.02 mm.$^{-1}$.

2. The method of claim 1, wherein said chlorine containing agent is a member selected from the group consisting of the chlorides of alkaline earth metals, zinc, cadmium, lanthanum and aluminum.

3. The method of claim 1, wherein said dry atmosphere is a member selected from the group consisting of dry air, nitrogen, helium, argon, oxygen, carbon dioxide and sulfur dioxide.

4. The method of claim 1 wherein said chlorine containing agent is anhydrous calcium chloride and said dry atmosphere is nitrogen.

References Cited
UNITED STATES PATENTS

| | | | |
|---|---|---|---|
| 2,982,053 | 5/1961 | Elmer | 65—134 X |
| 3,320,043 | 5/1967 | Mackenzie | 106—47 X |
| 3,338,694 | 8/1967 | Davy | 106—39 X |

FOREIGN PATENTS

| | | |
|---|---|---|
| 959,318 | 3/1957 | Germany. |

OTHER REFERENCES

Morey, G. W. The properties of Glass, New York (Reinhold), 1954, p. 421.

Parikh, N. M., and Simpson, H. E. Germania Glasses: The System $Na_{2O}$—CaO—$GeO_2$, in J. Amer. Cer. Soc., 35, 1952 pp. 99–102.

Kapany, N.S. Fiber Optics, New York, 1967, pp. 271, 273, 288.

HELEN M. McCARTHY, Primary Examiner

W. R. SATTERFIELD, Assistant Examiner

U.S. Cl. X.R.

65—134